United States Patent [19]

Ikeda et al.

[11] Patent Number: 5,322,378
[45] Date of Patent: Jun. 21, 1994

[54] LABEL PRINTER WITH INTERRUPT FUNCTION

[75] Inventors: Masashi Ikeda, Numazu; Kazuhide Takahama; Michio Suzuki, both of Shizuoka, all of Japan

[73] Assignee: Tokyo Electric Co., Ltd., Tokyo, Japan

[21] Appl. No.: 980,428

[22] Filed: Nov. 23, 1992

Related U.S. Application Data

[63] Continuation of Ser. No. 662,317, Feb. 23, 1991, abandoned, which is a continuation of Ser. No. 512,032, Apr. 13, 1990, abandoned, which is a continuation of Ser. No. 211,460, Jun. 24, 1988, abandoned.

[30] Foreign Application Priority Data

Jun. 30, 1987 [JP] Japan .................. 62-162858

[51] Int. Cl.$^5$ ............................................. B41J 11/44
[52] U.S. Cl. ............................. 400/68; 395/115
[58] Field of Search ................... 400/61, 68, 76; 395/113, 114, 115, 116; 355/314

[56] References Cited

U.S. PATENT DOCUMENTS

| | | | |
|---|---|---|---|
| 4,026,403 | 5/1977 | Inose et al. | 400/61 |
| 4,099,860 | 7/1978 | Connin | 355/14 C |
| 4,162,848 | 7/1979 | Platt, III | 355/14 C |
| 4,440,248 | 4/1984 | Teraoka | 177/4 |
| 4,589,785 | 5/1986 | Sato | 400/76 |
| 4,630,067 | 12/1986 | Teraoka | 177/4 |
| 4,661,001 | 4/1987 | Takai et al. | 400/120 |
| 4,712,929 | 12/1987 | Kitaoka | 400/61 |
| 4,759,288 | 7/1988 | Persson | 101/288 |
| 4,765,765 | 8/1988 | Futakata | 101/288 |

FOREIGN PATENT DOCUMENTS

| | | | |
|---|---|---|---|
| 136273 | 8/1984 | Japan | 400/104 |
| 136274 | 8/1984 | Japan | 400/104 |
| 206679 | 10/1985 | Japan | 400/104 |

OTHER PUBLICATIONS

"Method of Defining . . . " IBM Tehcnical Disclosure Bulletin vol. 28, No. 9 pp. 3925-3927 Feb. 1986.

Primary Examiner—David A. Wiecking
Assistant Examiner—Steven S. Kelley
Attorney, Agent, or Firm—Frishauf, Holtz, Goodman & Woodward

[57] ABSTRACT

A label printer includes a thermal head, a keyboard unit for inputting label data including issuing number data determining the number of labels to be issued, a RAM for storing label data input by the keyboard unit, and a printing control circuit. The RAM at least first and second label data, and the printing control circuit performs a first label issuing operation in which the thermal head is driven to continuously print a label or labels according to the first label data read out from the RAM, interrupts the operation of the thermal head in response to an interrupt command input from the keyboard unit during the first label issuing operation and then changes the label issuing number data of the first label data stored in the RAM to indicate the number of remaining labels to be issued. The printing control circuit then performs a second label issuing operation in which the thermal head is driven to continuously print a label or labels according to the second label data, and then performs the first label issuing operation again after the second label issuing operation is completed.

19 Claims, 17 Drawing Sheets

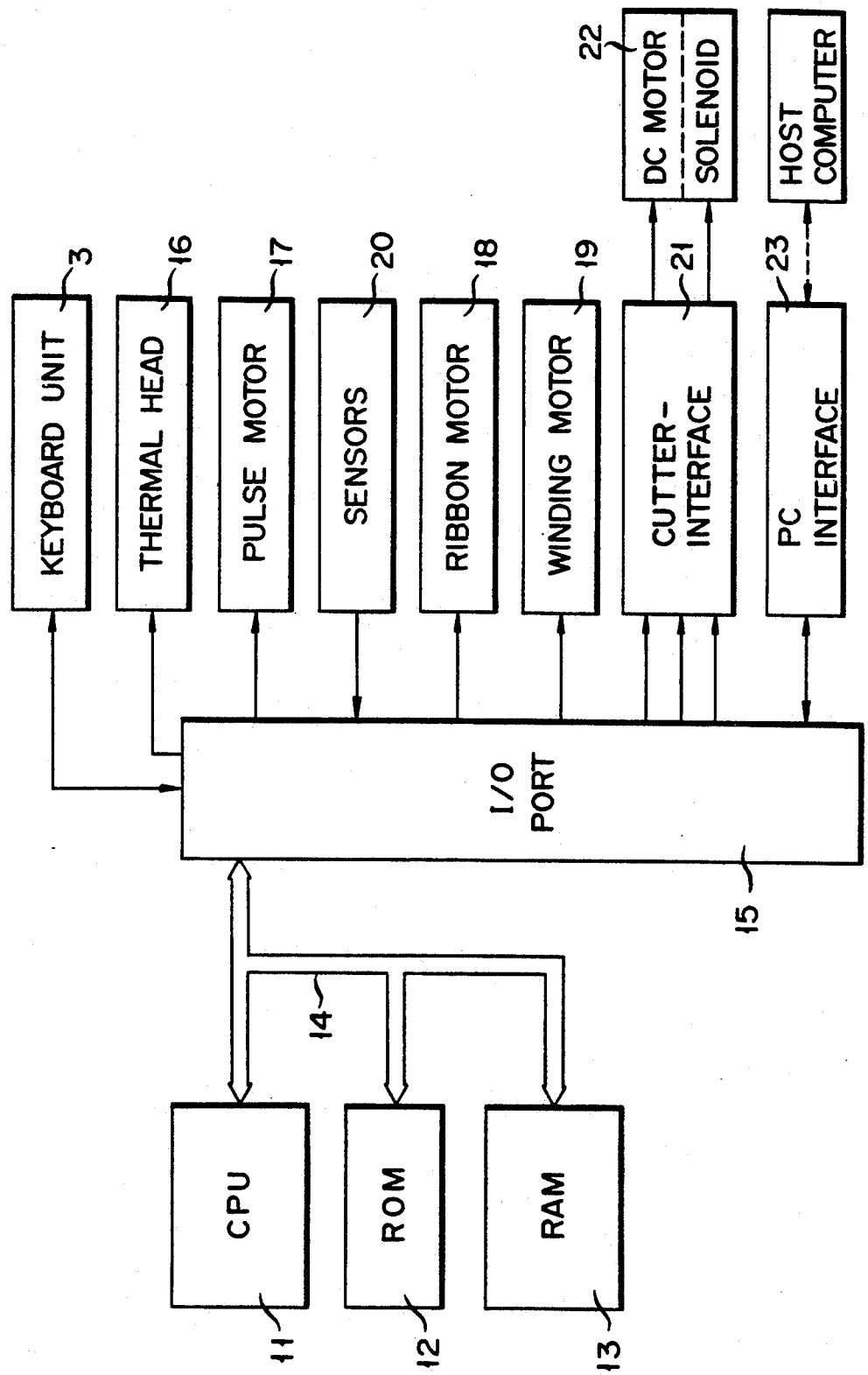
F I G. 3

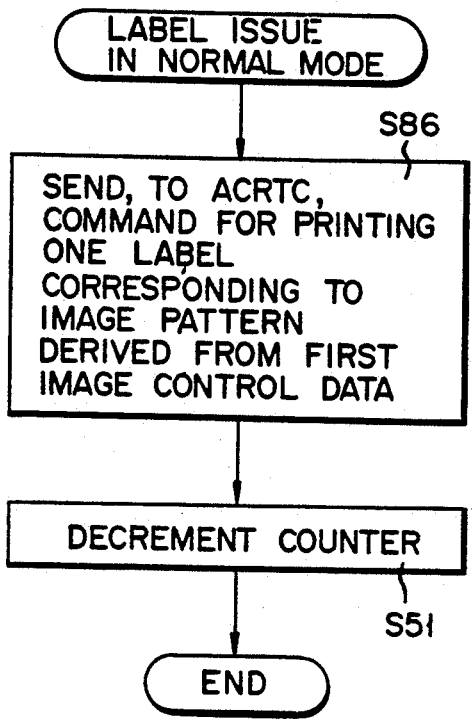
F I G. 18
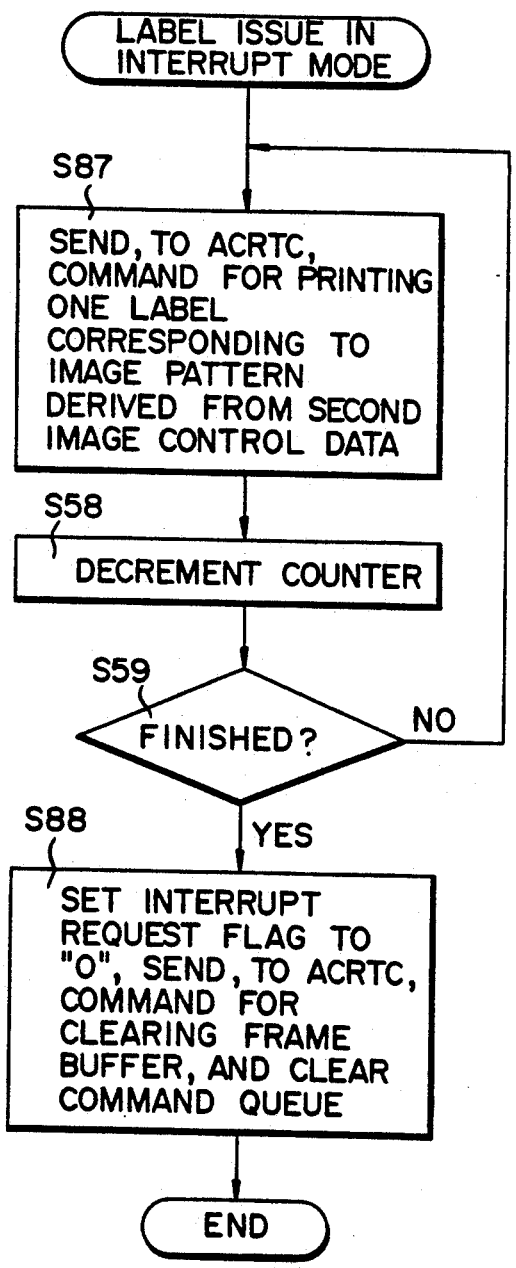
F I G. 19

LABEL PRINTER WITH INTERRUPT FUNCTION

This application is a continuation of application Ser. No. 07/662,317, filed Feb. 22, 1991, abandoned which is a continuation of Ser. No. 07/512,032, filed Apr. 13, 1990, which is a continuation of Ser. No. 07/211,460, filed Jun. 24, 1988 (both abandoned).

BACKGROUND OF THE INVENTION

1. Field of the Invention

This invention relates to a label printer.

2. Description of the Related Art

In the prior art, a label printer for issuing labels having characters and a bar code printed thereon is known. In a case where such labels are issued, printing format data and batch data are previously input into the label printer. The batch data includes label issuing number data and printing speed data in addition to printing data of characters and a bar code to be printed on the label. The printing format data includes various data for determining the coordinate position of the characters and bar code, the types of the characters and bar code, the magnified factor of the characters, and the density of the bar code. At the time of label issuing, the label printer continuously effects the printing operation and issues labels of the number determined by the label issuing number data.

When it is required to change the type of label in the label issuing operation and issue a different type of label, the different type of label may be issued after all the former type of labels are issued, for example. When it will take a long time to issue all the former type labels, or when it is required to issue the different type of label at once, then the operation of the former type of labels is forcedly interrupted.

In order to issue the different type of label, it is necessary to change the format data and batch data. In this case, since the format data and batch data of the former type of label are cleared when new format data and batch data are input, the former type of label cannot be continuously issued after the issuance of the different type of label is completed. For this reason, it is necessary to input the format data and batch data for the former type of label in order to issue the former type of labels additionally so that the required number of labels of the former type can be obtained.

Thus, the conventional label printer has the disadvantage that the operation becomes troublesome after issuance of one type of label is interrupted and a different type of label is issued.

SUMMARY OF THE INVENTION

An object of this invention is to provide a practical label printer which can continuously issue a first type of label even after the issuing operation is interrupted to issue another type of label.

The object can be attained by a label printer which comprises a printing section; an input unit for inputting label data including issuing number data determining the number of labels to be issued; a data memory for storing first and second label data input by means of the input unit; and a printing control unit for performing a first label issuing operation in which the printing section is driven to continuously print a label or labels according to the first label data read out from the data memory, interrupting the operation of the printing section in response to an interrupt command input from the input unit during the first label issuing operation and then changing the issuing number data of the first label data stored in the data memory to indicate the number of remaining labels to be issued, performing the second label issuing operation in which the printer section is driven to continuously print a label or labels according to the second label data, and then performing the first label issuing operation again after the second label issuing operation is completed.

In the label printer, since the number of remaining labels to be issued is stored as the label issuing number data when the first label issuing operation is forcedly interrupted, the first label issuing operation can be immediately performed without effecting complicated operation after the second label issuing operation is completed.

BRIEF DESCRIPTION OF THE DRAWINGS

FIG. 3 is a block diagram showing a printer circuit provided in the label printer body of FIG. 1;

FIGS. 15 to 19 are flowcharts showing the operation of the printer circuit shown in FIG. 13.

DETAILED DESCRIPTION OF THE PREFERRED EMBODIMENTS

There will now be described an embodiment of this invention with reference to FIGS. 1 to 12.

Figure 1:
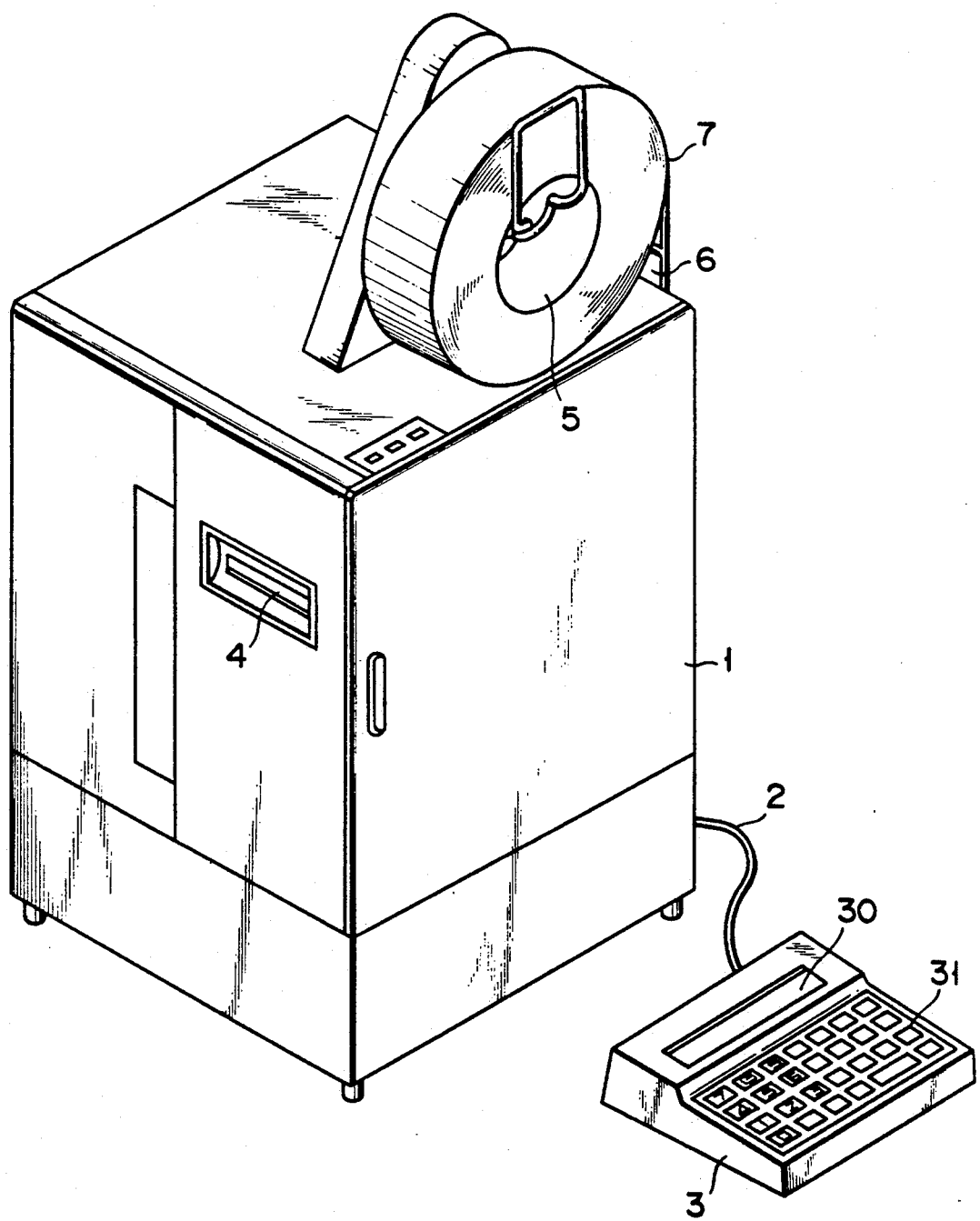
FIG. 1 is a perspective view of a label printer according to one embodiment of this invention.

FIG. 1 is a perspective view of a label printer according to one embodiment of this invention, and the label printer includes label printer body 1, and keyboard unit 3 connected to label printer body 1 via cord 2.

Label issuing slot 4 is formed on the front side of label printer body 1, and paper reel 5 is mounted on top of label printer body 1. Rolled base paper 7 on which seal labels 6 are attached at a regular interval is mounted on paper reel 5. Base paper 7 is fed into label printer body 1 from the rear thereof and is carried to the printing position.

Figure 2:
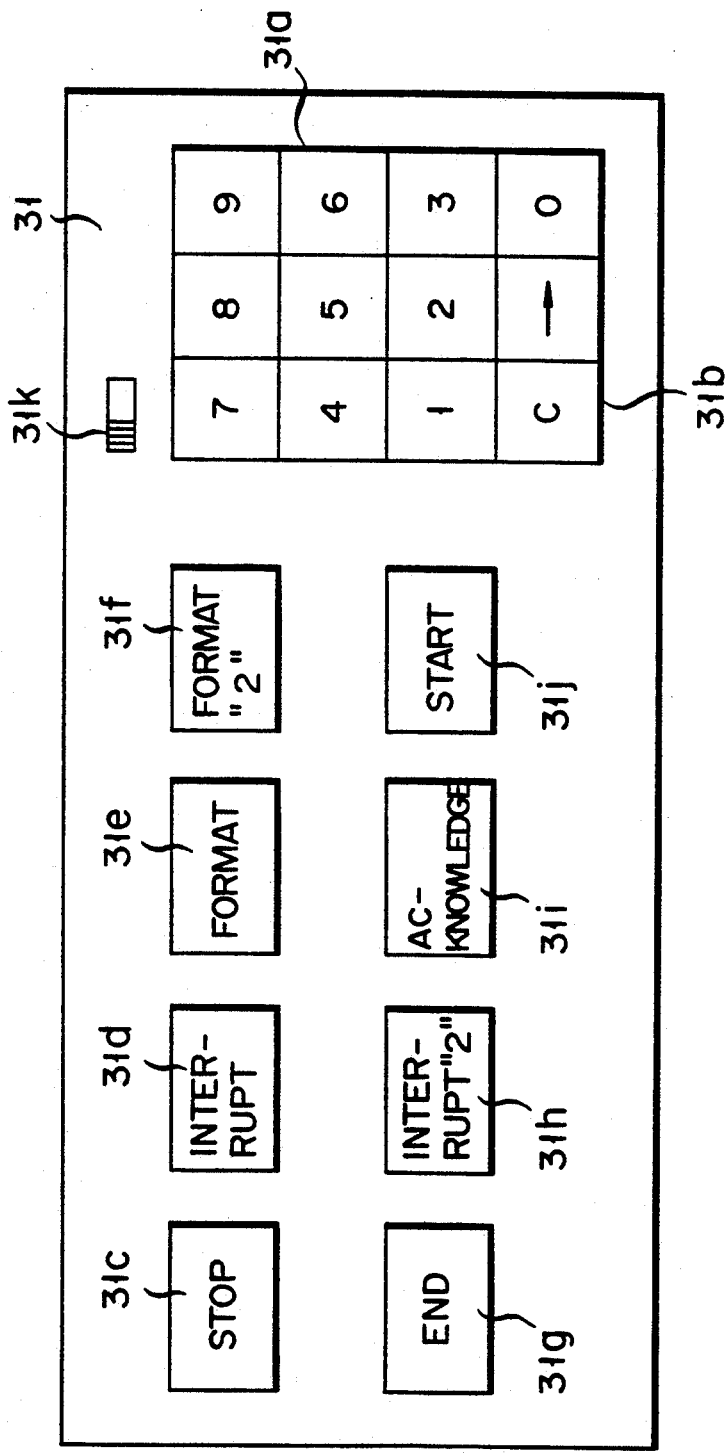
FIG. 2 is a diagram showing the key arrangement of a keyboard unit used in the label printer of FIG. 1.

Display 30 and keyboard 31 are provided on keyboard unit 3. As shown in FIG. 2, keyboard 31 includes numeral keys 31a, clear key 31b, stop key 31c, interrupt key 31d, format key 31e, format "2" key 31f, end key 31g, interrupt "2" key 31h, acknowledge key 31i, start key 31j, test-issuing switch 31k and the like.

FIG. 3 is a block diagram showing a printer circuit provided in label printer body 1, and the printer circuit includes CPU 11 constituting the main control section, ROM 12 storing program data used by CPU 11 to control various sections, and RAM 13 for storing various processing data.

CPU 11 is connected to ROM 12, RAM 13 and I/O port 15 via bus line 14. Keyboard unit 3 is connected to I/O port 15.

The printer circuit further includes thermal head 16, pulse motor 17 for feeding base paper 7 together with labels 6 to a position in which thermal head 16 is arranged, ribbon motor 18 for feeding an ink ribbon, paper take-up motor 19 for rotating a take-up roller to take up base paper 7 after the label is issued, and various sensors 20 including a label sensor, ribbon sensor, treadle sensor and the like. The elements described above are connected to I/O port 15.

I/O port 15 is also connected to cutter 22 having a DC motor and a solenoid via cutter interface 21. When the labels to be printed are connected in series to form a continuous label paper without using the base paper or when a tag printing paper is used, cutter 22 is used to cut apart a printed label with a preset length from the remaining portion of the label paper.

Further, I/O port 15 is connected to PC interface 23 which is used when a personal computer constituting the host computer is connected.

Figure 4:
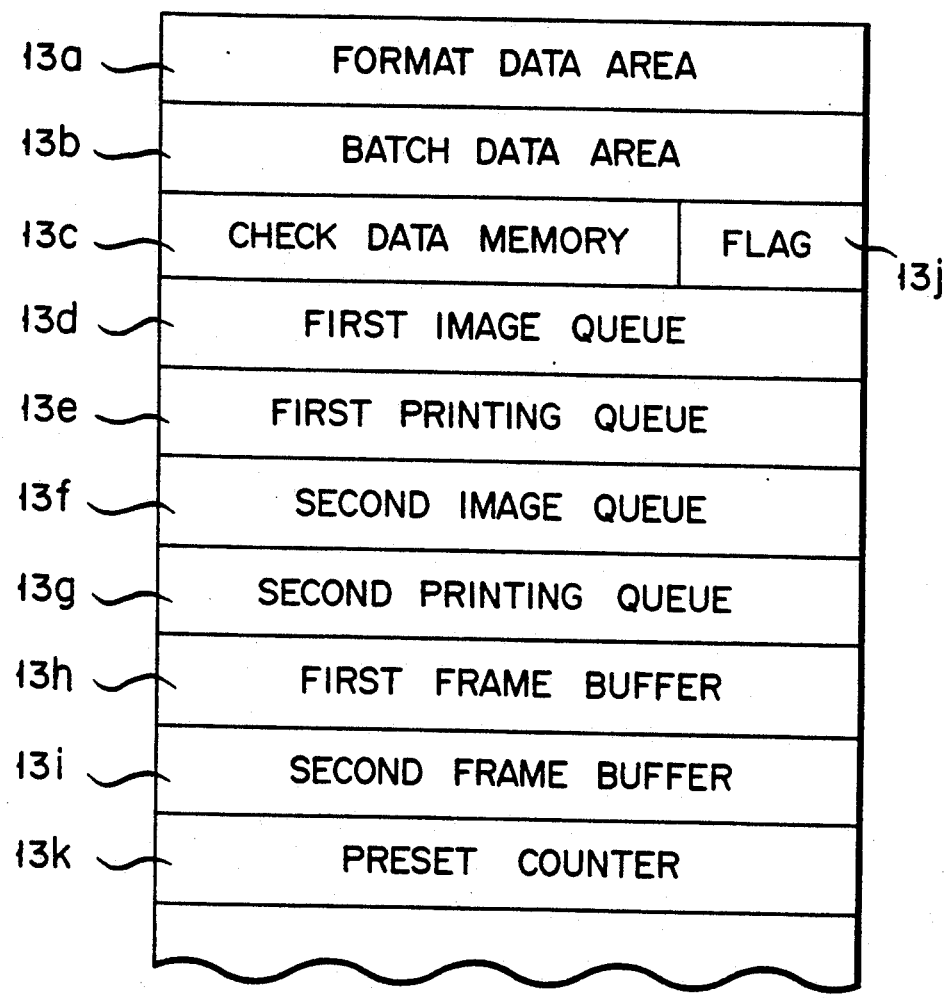
FIG. 4 is memory map of a RAM used in the printer circuit of FIG. 3.

As shown in FIG. 4, RAM 13 includes various memory areas respectively constituting format data area 13a, batch data area 13b, check data memory 13c, first image queue 13d, first printing queue 13e, second image queue 13f, second printing queue 13g, first image frame buffer 13h, second image frame buffer 13i, interrupt request flag memory 13j and preset counter 13k. Format data memory 13a and batch data area 13b are used to temporarily store format data and batch data which are entered as label data by the key operation on keyboard 31. Data used for checking the function of thermal head 16 is preset in check data memory 13c.

Image queues 13d and 13f are buffers used to store image control data which can be derived from format data and batch data stored in data memories 13a and 13b, and includes data of coordinate position, magnified factor and rotation angle of characters and a bar code for defining an image to be printed. Printing queues 13e and 13b are buffers used to store printing control data which can be derived from format data and batch data stored in data memories 13a and 13b, and includes data of label-issuing number, the size of labels, the necessity of cutting operation, printing speed and the like for defining a label printing-issuing condition.

FIGS. 5 to 12 are flowcharts showing the operation of the label printer. When the power source of the label printer is turned on, CPU 11 performs the data processing operation according to the flowchart shown in FIG. 5. First, the initialization is effected and memory areas 13a to 13k of RAM 13 are cleared in step S11, for example. At this time, the interrupt request flag is set to "0". Then, in steps S12 to S14, it is checked whether or not any one of format key 31e, format "2" key 31f and start key 31j is operated. If format key 31e is detected to be depressed, the first input processing is effected in step S15 and then step S13 is effected. If format "2" key 31f is detected to be depressed, the second input processing is effected in step S16 and then step S14 is effected. Further, if start key 31j is detected to be depressed, step S18 is effected. If none of format key 31e, format "2" key 31f and start key 31j are detected to be depressed, steps S12, S13 and S14 are repeatedly effected.

Figure 6:
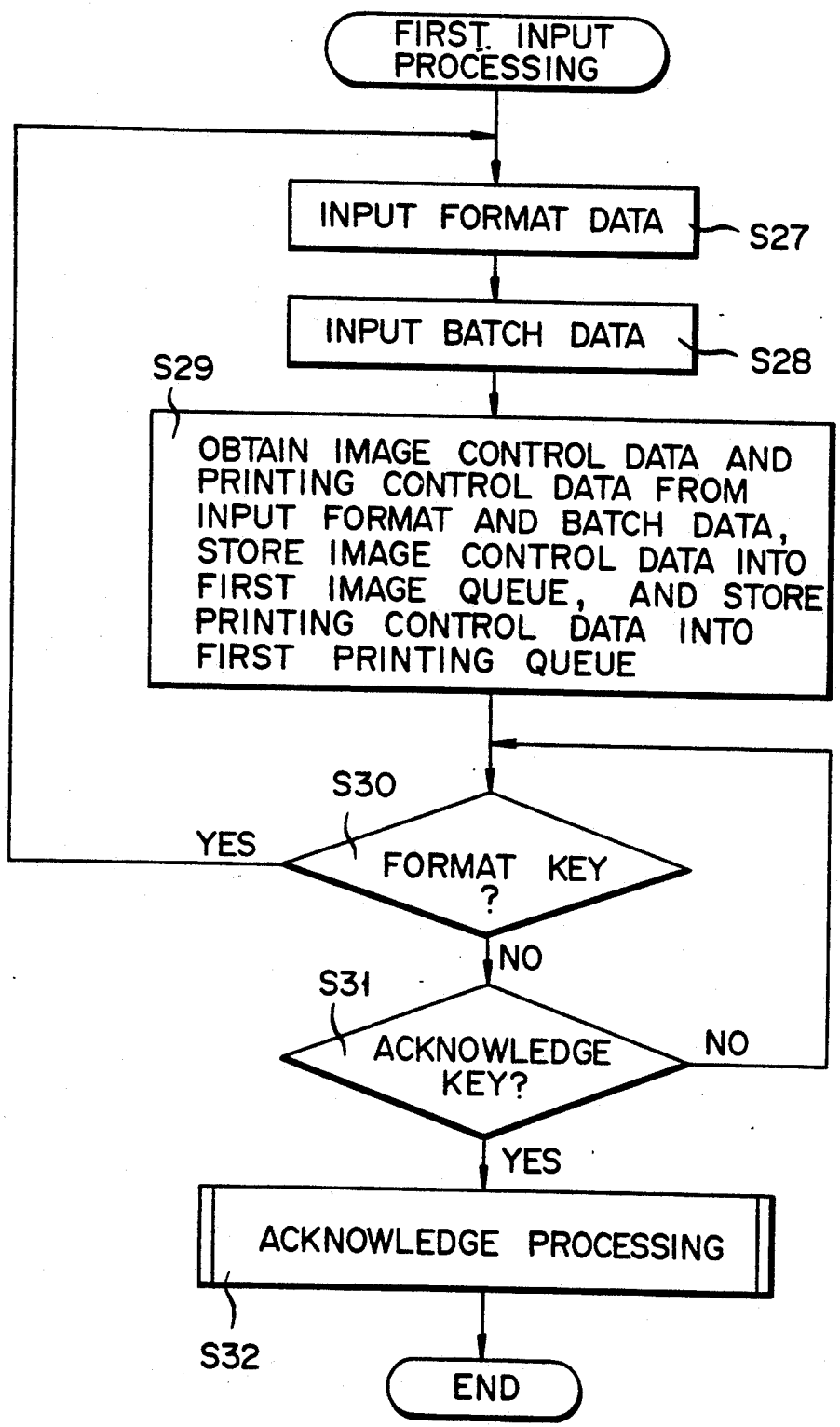

FIG. 6 shows the first input processing in detail. When the processing is started, format data is input from keyboard 3 according to the input request displayed on display 30 and stored in format data area 13a in step S27. The format data includes the coordinate positions of the character and bar code to be printed on each label, the type of the character and bar code, the magnification factor of the character, the density of the bar code, rotation angles of the character and bar code, the size of the label and format number. After this, in step S28, batch data is input from keyboard 3 according to the input request displayed on display 30 and stored in batch data area 13b. The batch data includes printing data indicating characters and a bar code, label issuing number data and printing speed data. Then, image forming data or items of coordinate position, character and bar code, the type, magnification factor and rotation angle are derived from the format and batch data are stored as image control data in first image queue 13d in step S29. At this time, printing-issuing condition data including label-issuing number and label size is derived from the format and batch data and is stored as printing control data in first printing queue 13e. It is checked in steps S30 and S31 whether the data input operation described above is completed or not. If format key 31e is detected to be depressed in step S30, step S27 is effected again and data is input. If acknowledge key 31i is detected to be depressed in processing is completed, and the acknowledge processing shown in FIG. 7 is effected in step S32.

Figure 7:
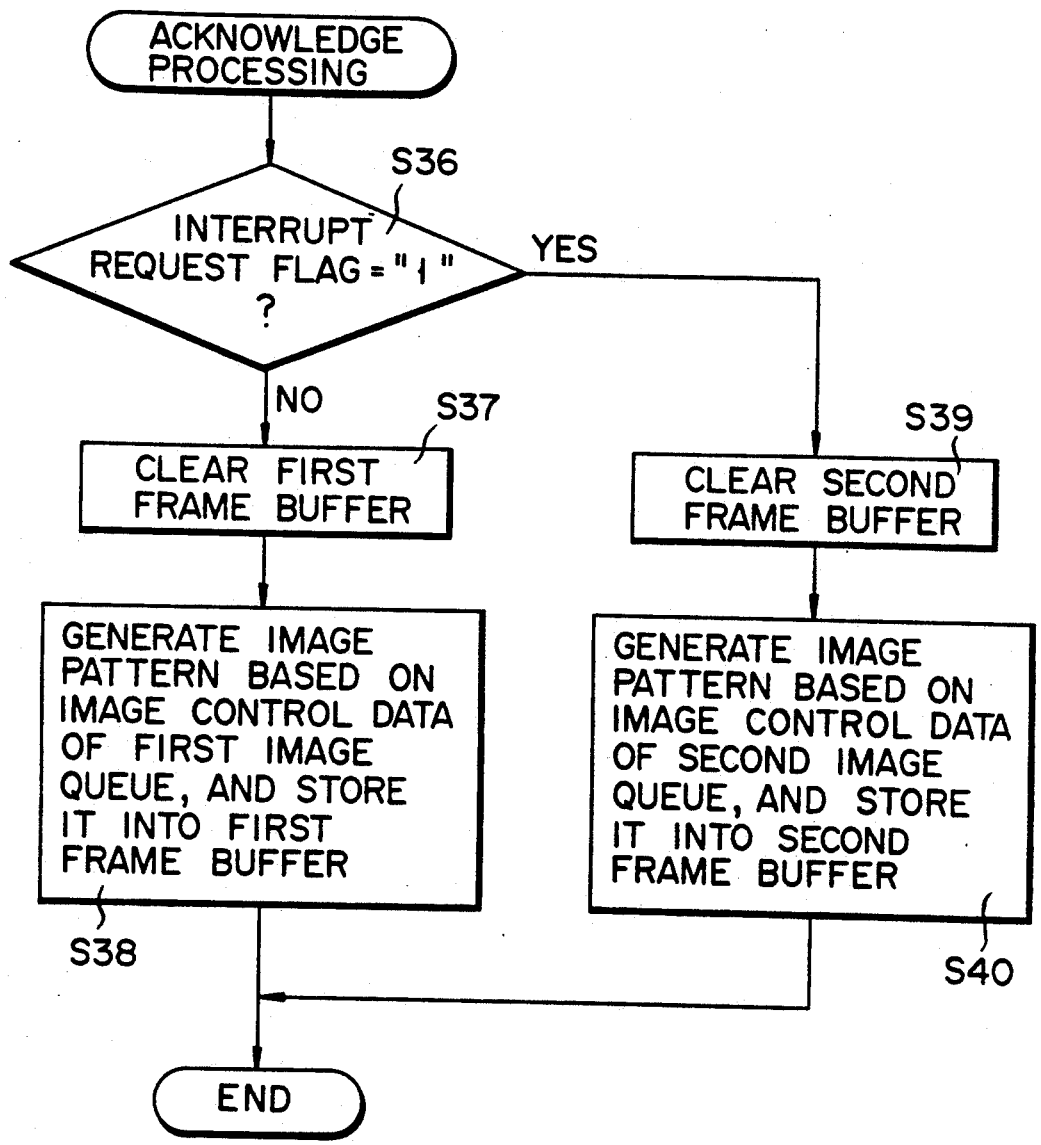

When the acknowledge processing of FIG. 7 is started, it is checked in step S36 whether the interrupt request flag is "1" or not. If the interrupt request flag is detected to be "0", first frame buffer 13h is cleared in step S37. Then, in step S38, an image pattern is generated according to image control data stored in first image queue 13d and is stored in first frame buffer 13h. If the interrupt request flag is detected to be "1", second frame buffer 13i is cleared in step S39, and then in step S40, and image pattern is generated according to image control data stored in second image queue 13f and is stored in second frame buffer 13i.

Figure 8:
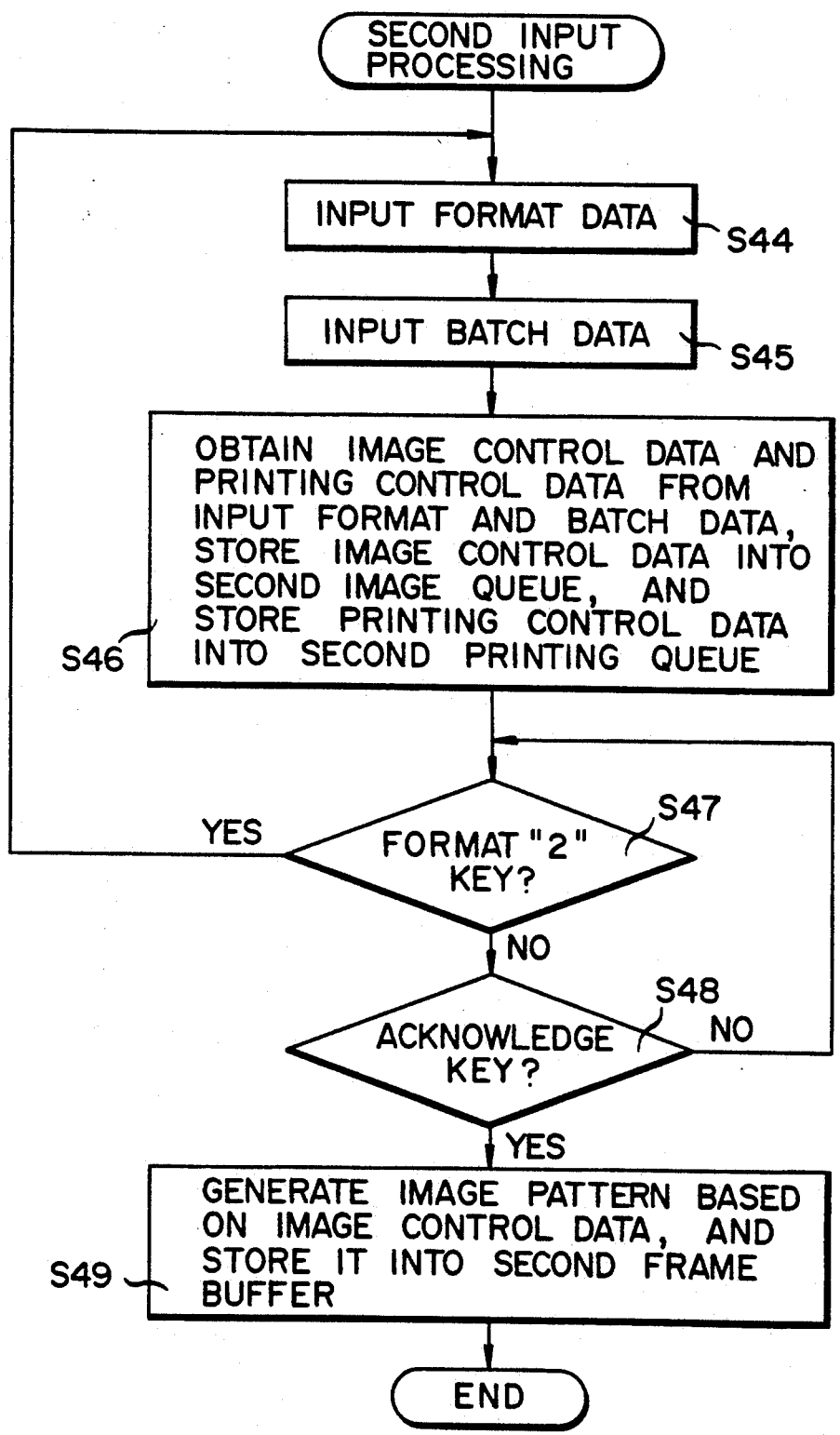

FIG. 8 shows the second input processing in detail. When the processing is started, first format data is input from keyboard unit 3 according to the input request displayed on display 30 in step S44 and is then stored in format data area 13a. In step S45, batch data is input from keyboard unit 3 according to the input request displayed on display 30 and is stored in batch data area 13b. In step S46, image formation data is derived from the format data and batch data and stored as image control data in second image queue 13f. Further, printing-issuing condition data is derived from the format data and batch data and stored as printing control data in second printing queue 13g. In steps S47 and S48, whether the data input operation is completed or not is checked. If format "2" key 31f is detected to be depressed in step S47, step S44 is effected again and data is input. If acknowledge key 31i is detected to be depressed in step S48, it is determined that the input operation is completed, and step S49 is effected. In step S49, image pattern data is generated according to the image control data stored in second image queue 13f and is stored in second frame buffer 13i.

Figure 5:
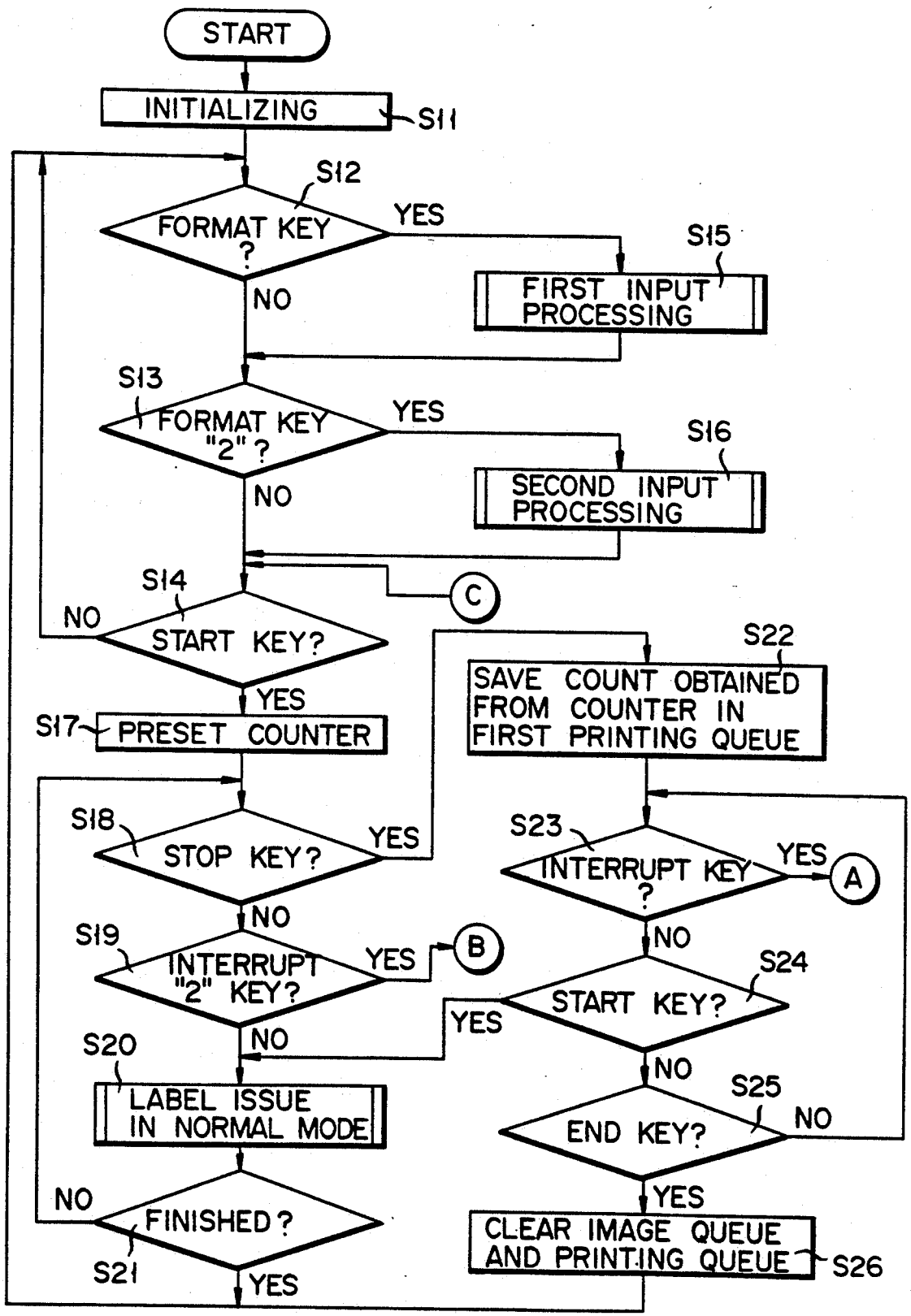
FIGS. 5 to 12 are flowcharts showing the operation of the label printer shown in FIGS. 1 to 4.

If start key 31j is detected to be depressed in step S14 of FIG. 5, label-issuing number data is read out from first printing queue 13e in step S17 and is set in counter 13k. Then, in steps S18 and S19, it is checked whether one of stop key 31c and interrupt "2" key 31h is depressed or not. If none of stop key 31c and interrupt "2" key 31h are detected to be depressed, the label issuing processing in the normal mode is effected in step S20. After this, whether the label issuing operation is completed or not is checked based on the count of counter 13k in step S21. Unless the count is detected to be "0", step S18 is effected again. Steps S18, S19, S20 and S21 are repeatedly effected until the label issuing operation is completed. If the count is detected to be "0" in step S21, step S12 is effected.

Figure 9:
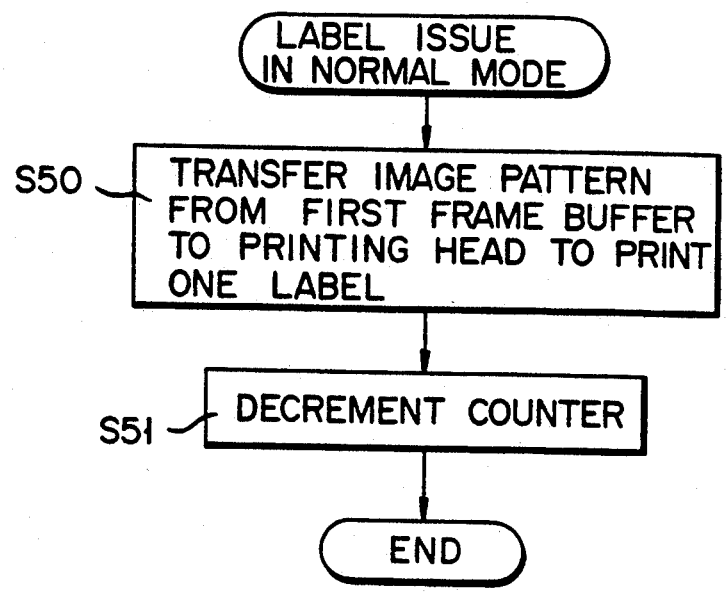

FIG. 9 shows the label issuing processing in detail. When the processing is started, an image pattern is first transferred from first frame buffer 13h to printing head 16, and printing head 16 is driven according to the image pattern to print data on a label. After being printed, the label is issued from label issuing slot 4, and the content of counter 13k indicating the number of labels to be further issued is decremented by "1" in step S51.

Figure 10:
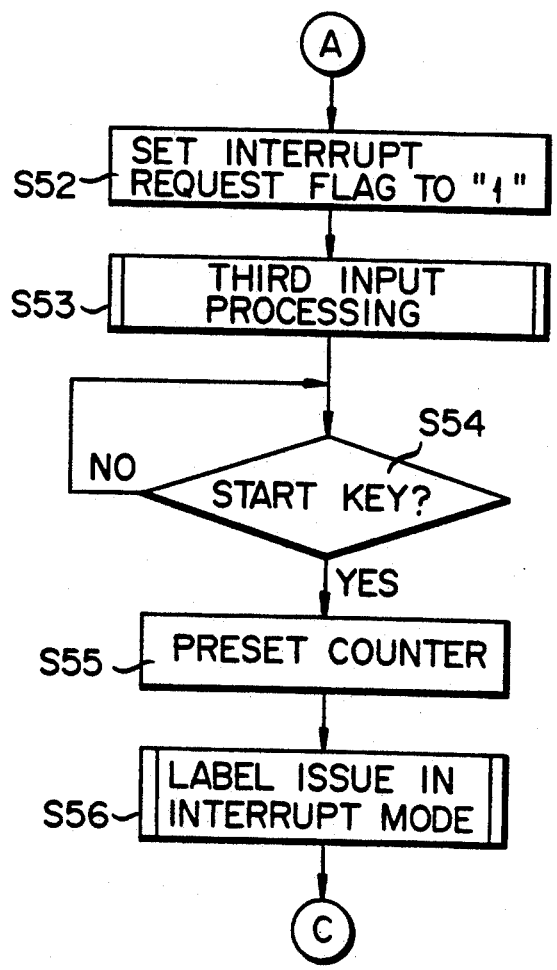

If stop key 31c is detected to be depressed in step S18 of FIG. 5, label-issuing number data in first printing queue 13e is set equal to the count of counter 13k. Then, whether one of interrupt key 31d, start key 31j and end key 31g is depressed or not is checked in steps S23, S24 and S25. If none of the keys are detected to be operated, steps S23, S24 and S25 are repeatedly effected. If interrupt key 31d is detected to be depressed in step S23, step S52 shown in FIG. 10 is effected. If start key 31j is detected to be depressed, step S20 is effected. Further, if end key 31g is detected to be depressed, first image queue 13d and first printing queue 13e are cleared, and then step S12 is effected again.

Figure 11A:
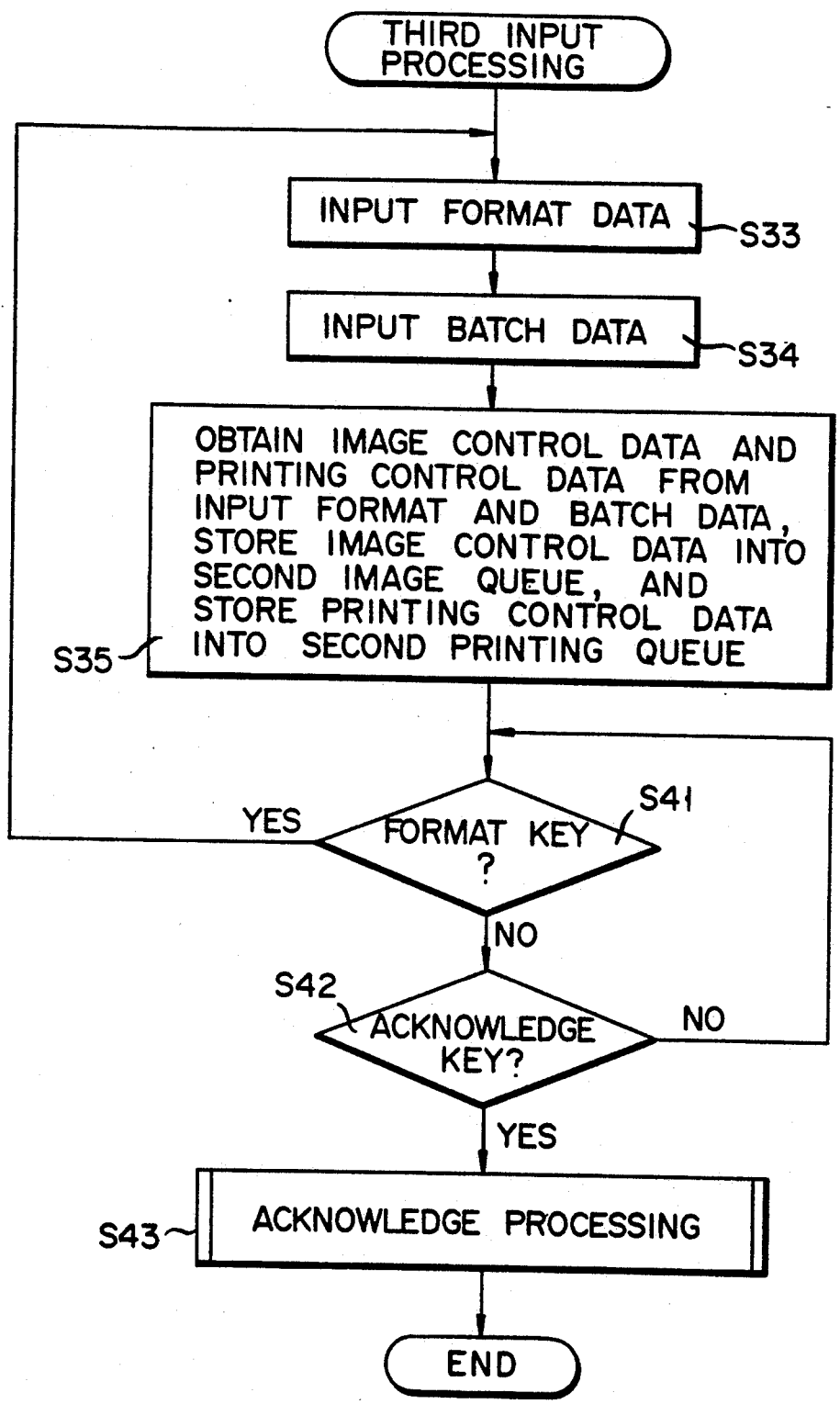
Figure 11B:
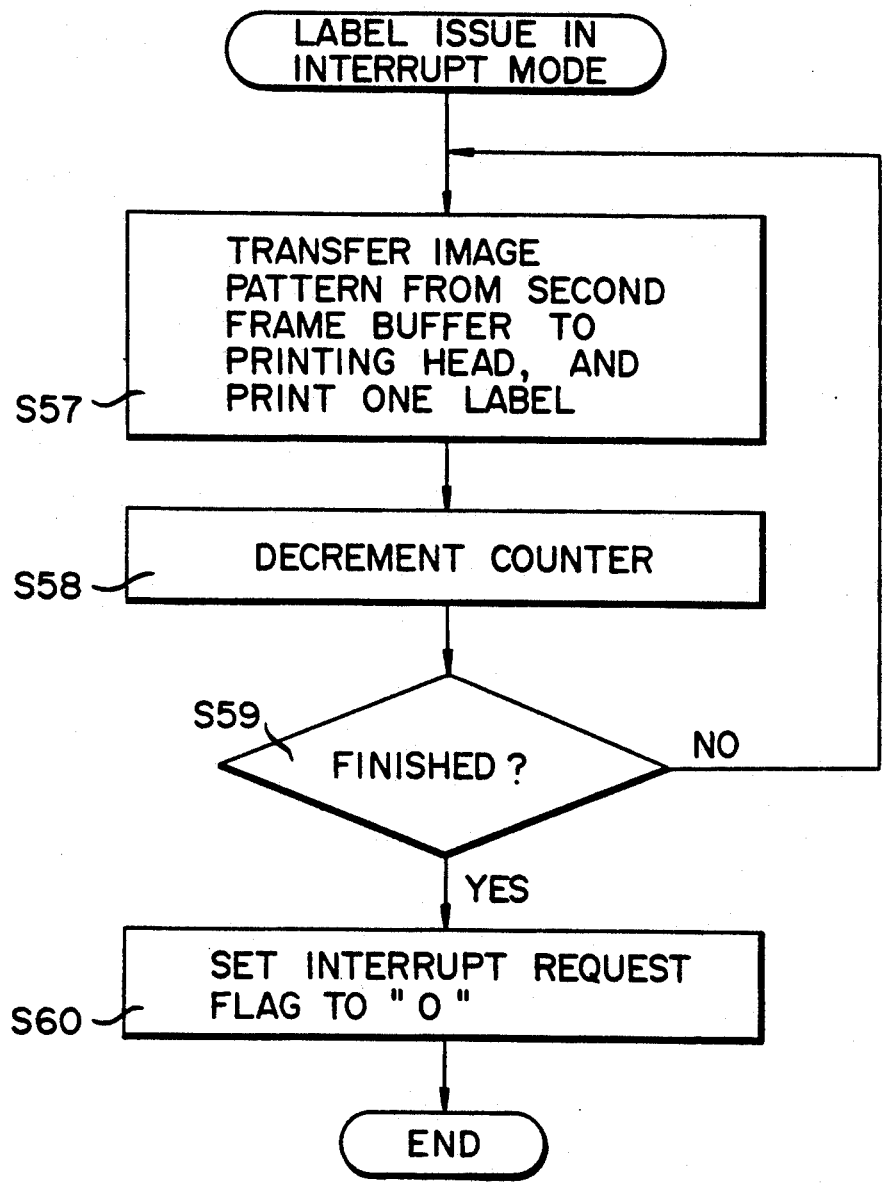

In step S52 of FIG. 10, the interrupt request flag is set to "1". Next, in step S53, the third input processing shown in FIG. 11A is effected. After the first input processing is completed, it is checked in step S54 whether start key 31j is depressed or not. Step S54 is repeatedly effected until start key 31j is detected to be depressed. If start key 31j is detected to be depressed, label-issuing number data is read out from second printing queue 13g and set in counter 13k. Then, the label issuing operation in the interrupt mode shown in FIG. 11B is effected in step S56. After the label issuing operation is completed, step S12 is effected again.

When the third input processing of FIG. 11A is started, format data is input from keyboard 3 according to the input request displayed on display 30 and stored in format data area 13a in step S33. The format data includes the coordinate positions of the character and bar code to be printed on each label, the type of the character and bar code, the magnification factor of the character, the density of the bar code, rotation angles of the character and bar code, the size of the label and format number. After this, in step S34, batch data is input from keyboard 3 according to the input request displayed on display 30 and stored in batch data and characters and a bar code, label issuing number data and printing speed data. Then, image forming data or items of coordinate position, character and bar code, the type, magnification factor and rotation angle are derived from the format and batch data and are stored as image control data in second image queue 13f in step S35. At this time, printing-issuing condition data including data label-issuing number and label size is derived from the format and batch data and is stored as printing control data in second printing queue 13g. It is checked in steps S41 and S42 whether the data input operation described above is completed or not. If format key 31e is detected to be depressed in step S41, step S33 is effected again and data is input. If acknowledge key 31i is detected to be depressed in step S42, it is determined that the third input processing is completed, and the acknowledge processing shown in FIG. 7 is effected in step S43.

When the label issuing process of FIG. 11B is started, an image pattern is transferred from second frame buffer 13i to printing head 16, and printing head 16 is driven is response to the image pattern to print data on a label. After being printed, the label is issued from label issuing slot 4, and the content of counter 13k indicating the number of labels to be issued is decremented by "1" is step S51. After this, whether the label issuing process is completed or not is checked according to the count of counter 13k in step S59. If it is detected that the count is not "0", step S57 is effected again. Steps S57, S58 and S59 are repeatedly effected until the label issuing process is completed. When the count is detected to be "0" in step S59, the interrupt request flag is set to "0".

Figure 12:
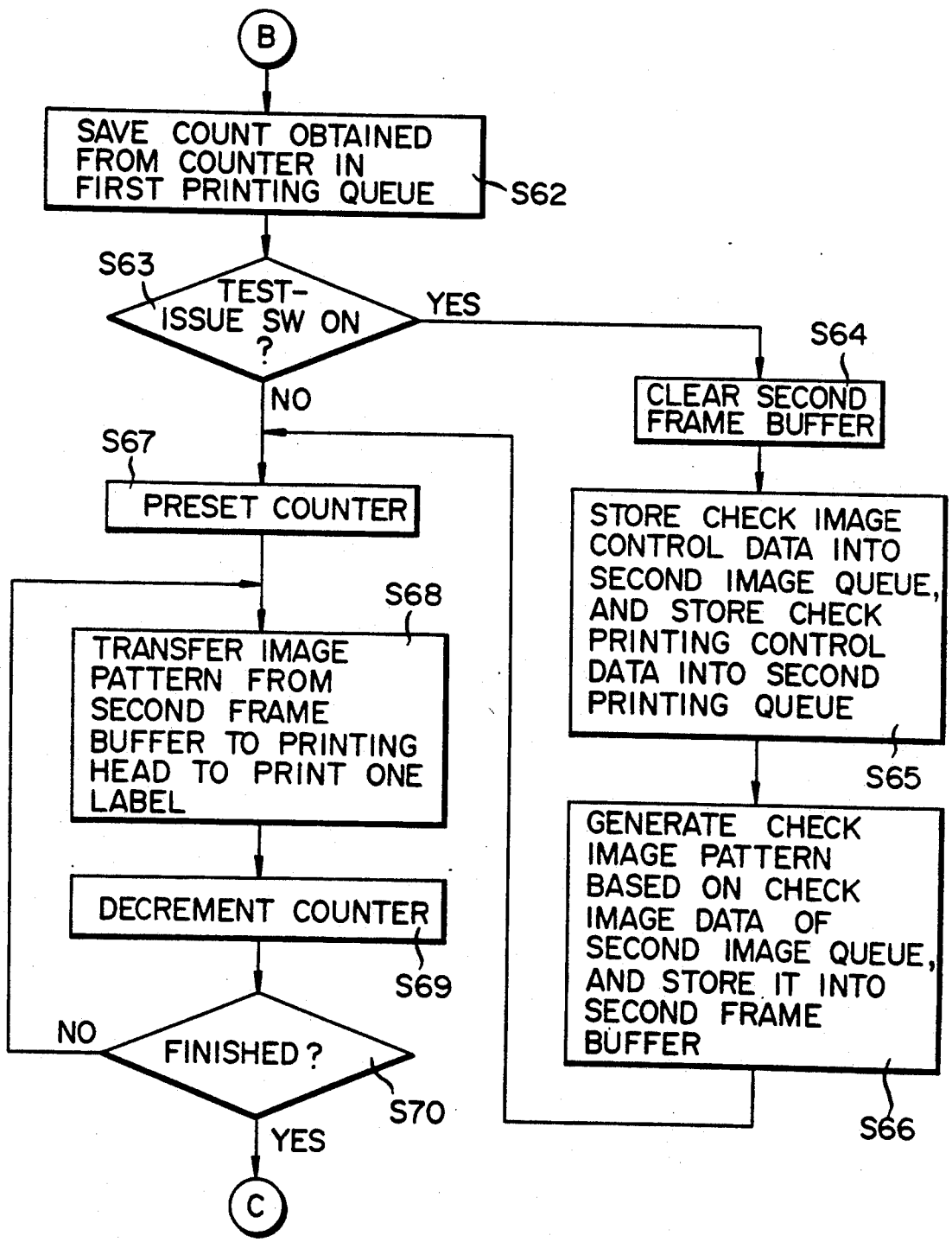

FIG. 12 shows the interrupt "2" key processing. When interrupt "2" key 31h is detected to be depressed in step S19 of FIG. 5, label-issuing number data in first printing queue 13e is set equal to the count of counter 1i in step S62. Then, it is checked in step S63 whether test issue switch 31k on keyboard unit 3 is set ON or not. If "yes" in step S63, second frame buffer 1i is cleared in step S64. After this, check image control data and check printing control data are read out from check data area 13c and stored in second image queue 13f and second printing queue 13b in step S65. Further, in step S66, a check image pattern is generated based on the check image data stored in second image queue 13f and is stored in second image buffer 13i. Then, step S67 is effected. Step S67 is also effected when it is detected in step S63 that test issue switch 31k is not set in ON position. In step S67, label-issuing number is read out from second printing queue 13b and stored in counter 13k. After this, image pattern data is transferred from second frame buffer 31i to printing head 16 in step S68, and printing head 16 is driven in response to the image pattern to print data on a label. After being printed, the label is issued from label issuing slot 4, and the content of counter 13k is decremented by "1" in step S69. After this, whether the label issuing process is completed of not is checked according to the count of counter 13k in step S70. If it is detected that the count is not "0", step S68 is effected again. Steps S68, S69 and S70 are repeatedly effected until the label issuing process is completed. When the count is detected to be "0" in step S70, step S14 of FIG. 5 is effected.

In the embodiment with the construction described above, label format data input from keyboard unit 3 is stored in format data area 13a, and batch data is stored in batch data area 13b. In the normal label issuing operation, image formation data included in the format data and batch data in areas 13a and 13b is set in image queue 13d, and label printing-issuing condition data is set in printing queue 13e. An image pattern is formed according to data stored in image queue 13d when acknowledge key 31i is operated, and is stored in image frame buffer 13h. If, in this condition, start key 31j is depressed, data in image frame buffer 13h is supplied to thermal head 16, base paper 7 is fed by pulse motor 17, and a label is printed. Each time a label is issued, the count of counter 13k is changed so as to indicate the number of remaining labels to be printed.

In a case where it is required to issue a different label while the normal label issuing operation is being effected, stop key 31c is first operated. As a result, the normal label issuing operation is interrupted, and the count of counter 13k is saved in printing queue 13e. After this, when interrupt key 31d is depressed, "1" is set into interrupt request flag memory 13j.

After this, format data and batch data for the interrupt label are input, and are stored in format data area 13a and batch data area 13b, respectively. Image formation data included in the format data and batch data is stored in second image queue 13f and label-issuing condition data is stored in second printing queue 13g. Then, acknowledge key 31i is operated. This key operation causes an image pattern to be formed based on data in second image queue 13f and stored in image frame buffer 13i. Next, start key 31j is operated. This key operation causes the image pattern to be transferred from image frame buffer 13i to thermal head 16 and repeatedly used to print interrupt labels. In this case, the number of labels to be further issued is controlled based on the label-issuing number set in printing queue 13g.

In this way, if a desired number of interrupt labels are issued, the label issuing processing is completed and the interrupt request flag in flag memory 13i is reset.

After this, start key 31j is operated again. This key operation causes data in image frame buffer 13h to be supplied to thermal head 16, thus starting the normal label issuing operation again. In the normal label issuing operation thus started again, the label-issuing number is determined by the number of labels to be printed which has been stored in printing queue 13e.

As described above, when it is desired to issue a label of a type different from that of normal labels which the label printer is issuing, it is possible to issue the different type of label with first priority. In this case, issuance of the normal labels is temporarily interrupted, but it can be started again by simply operating start key 31j after the different type of label or labels are issued, and then all the desired number of labels are issued. Further, since the image pattern required for the normal label issuing operation is stored in image frame buffer 13h, it is not necessary to input format data and batch data again. Thus, an interrupt label or labels can be issued before the end of the normal label issuing operation by a simple operation, and the normal label issuing operation can be continuously effected after the end of the interrupt label issuing operation without any troublesome operation, thus enhancing the practical application thereof.

When, for example, the printing quality is lowered in the normal label issuing operation, it is possible to check whether thermal head 16 is damaged or not. In this case, test operation switch 31k constituted by a dip switch or the like is operated and then interrupt "2" key 31h is depressed. As a result, check image control data and check print control data required for checking the function of the thermal head and stored in check data memory 13c are respectively stored in image queue 13f and printing queue 13g. Then, a check image pattern is formed based on check image control data read out from image queue 13f and is stored in image frame buffer 13i. At this time, the check image pattern is supplied to thermal head 16 and printed on a label.

The image check pattern can be freely set, and the function of thermal head 16 can be properly checked based on the printed label. The present label printer is especially advantageous in that the function of thermal head 16 can be checked during the normal label issuing operation.

Further, in the label printer, format data and batch data for a second type of label can be previously set by operating format "2" key 31f during the operation of issuing a first type of labels. In this case, first image queue 13d, first printing queue 13e and first frame buffer 13h are used for storing data for the first type label, and second image queue 13f, second printing queue 13b and second frame buffer 13i are used for storing data for the second type of label.

Interrupt "2" key 31h may be operated during the operation of issuing the first type of labels. Each time interrupt "2" key 31h is operated, the frame buffer used for the label printing operation is changed from first frame buffer 13h to second frame buffer 13i.

Thus, in this embodiment, data specifying two types of labels is previously set, and one type of label is issued as a main label and the other type of label is issued as a sub-label. Therefore, while the main labels are being issued as a price tags, for example, it is possible to issue a sub-label on which the label-issuing number indicating the number of issued price tags is printed. Further, when an article is packed in a box, the price tag attached to the article can be issued as the main label and an addressing label attached to the box can be issued as the sub-label. Thus, the operation of issuing different types of labels due to interrupt can be effected in various cases.

Further, in the above embodiment, data for issuing two types of labels is previously stored. However, this invention is not limited to this embodiment, and it is possible to previously store data for issuing three or more types of labels. In this case, one type of label may be used as the main label and the other types of labels may be selectively used as the sub-labels; one type of label may be used as the sub-label and the remaining types of labels may be used as the main labels; or plural types of labels may be selectively used as the main labels and the remaining types of labels may be selectively used as the sub-labels.

Now, the second embodiment of this invention is explained with reference to FIGS. 13 to 17.

Figure 13:
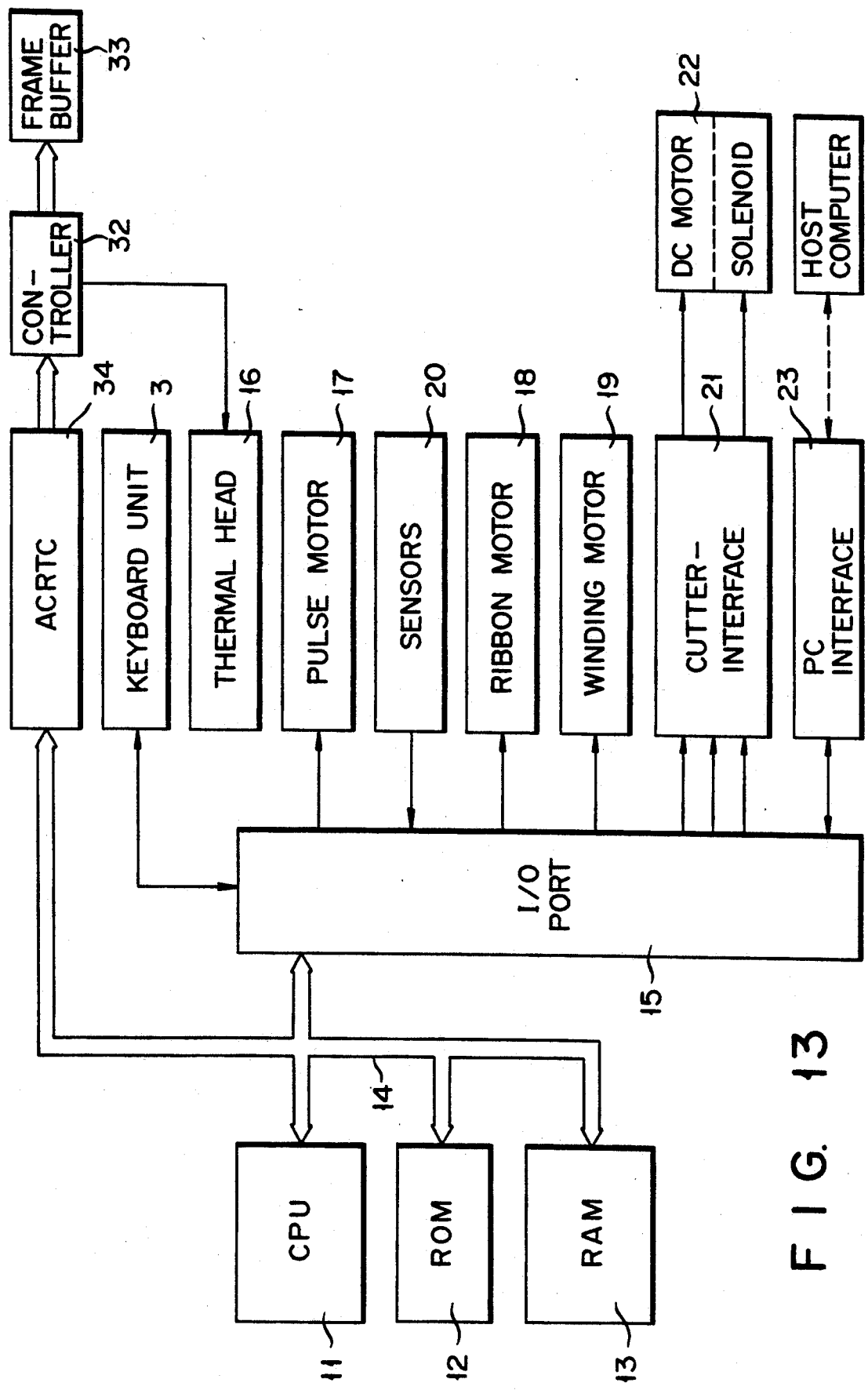
FIG. 13 is a block diagram of a printer circuit provided in a label printer according to another embodiment of this invention.
Figure 14:
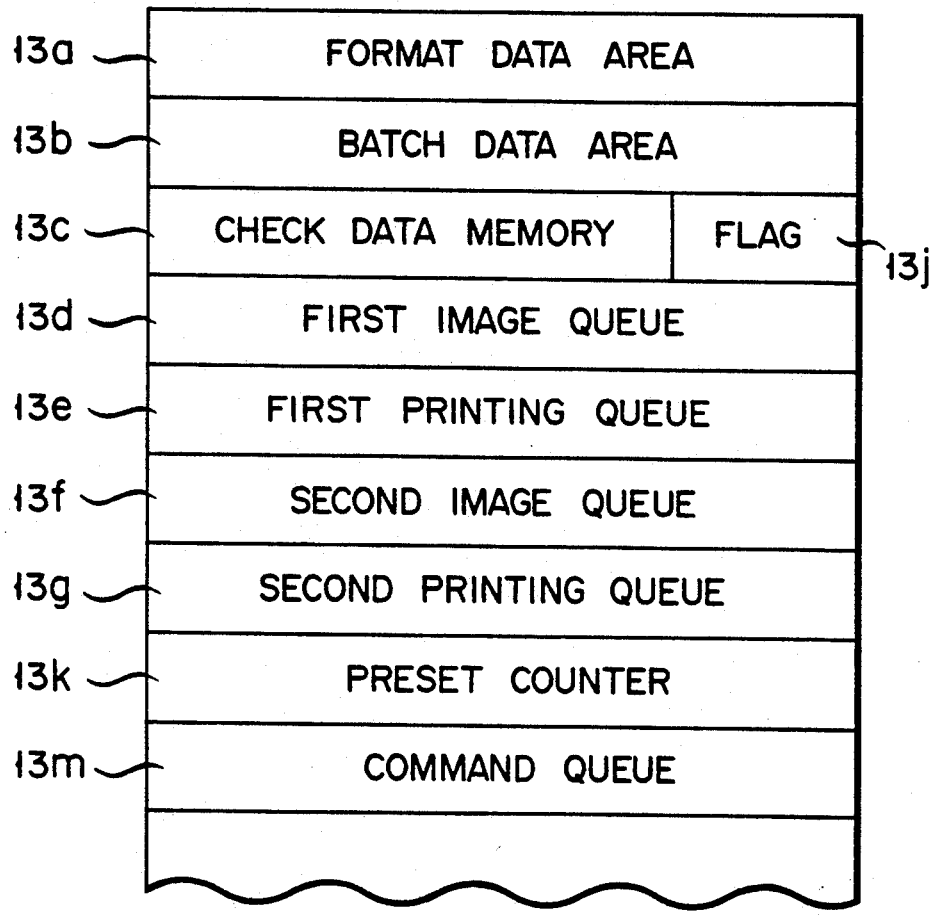
FIG. 14 is a memory map of a RAM used in the printer circuit of FIG. 13.

As shown in FIG. 13, A (Advanced) CRT controller 34 which is a graphic controller is used to control image frame buffer 33 and thermal head 16 by means of control section 32. In this case, it is not necessary to provide first and second image frame buffers 13h and 13i in RAM 13. Further, as shown in FIG. 14, ACRT controller command queue 13m is provided. Thermal head 16 is not connected to I/O port 15 and is not controlled via I/O port 15.

FIGS. 15 to 19 are diagrams showing modified data processing flow which is effected to issue labels at the time of interrupt. That is, FIGS. 15 to 19 are respective modifications of FIGS. 10, 5, 7, 9 and 11. Modified data processing flow for format "2" key 31f is omitted.

Figure 15:
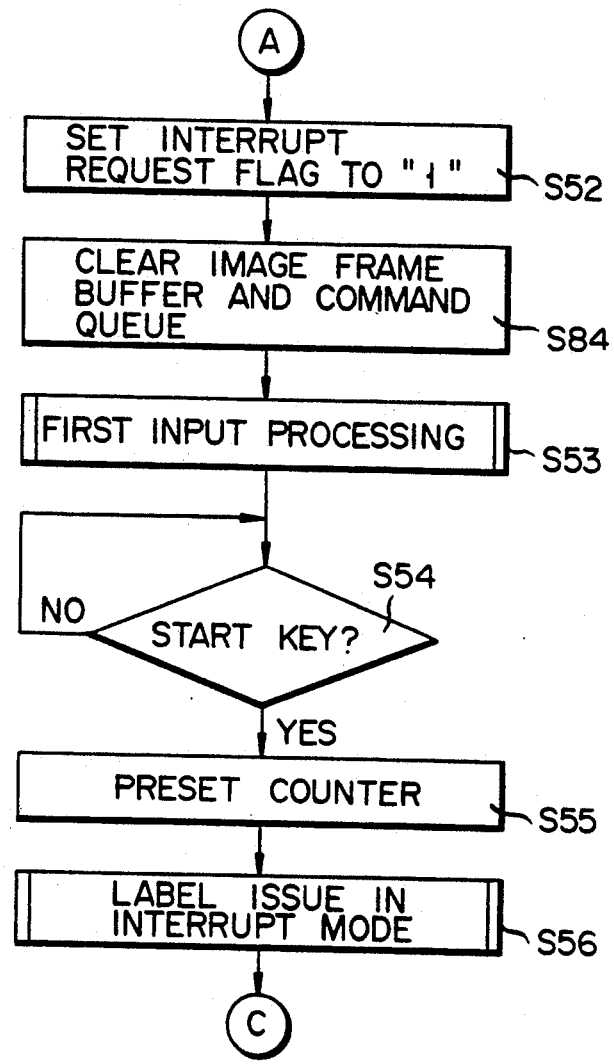

When interrupt key 31d is detected to be operated in step S52 as shown in FIG. 15, interrupt request flag 13j is set to "1" in step S52. In the following step S84, image frame buffer 33 is cleared and ACRT controller command queue 13m is also cleared.

Figure 16:
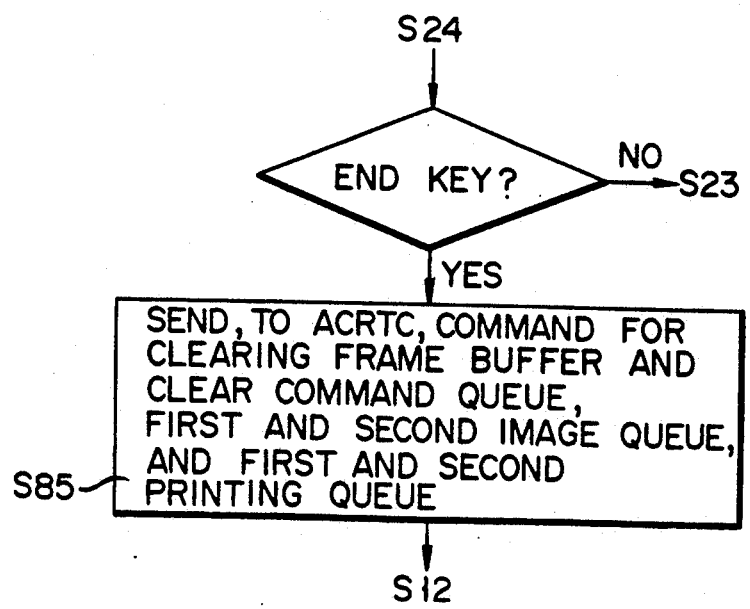

When end key 31g is detected to be operated in step S25 as shown in FIG. 16, a command is given to ACRT controller 34 to clear image frame buffer 33 in step S85, and also ACRT controller command queue 13m, printing queues 13e, 13b and image queues 13d, 13f are cleared.

Figure 17:
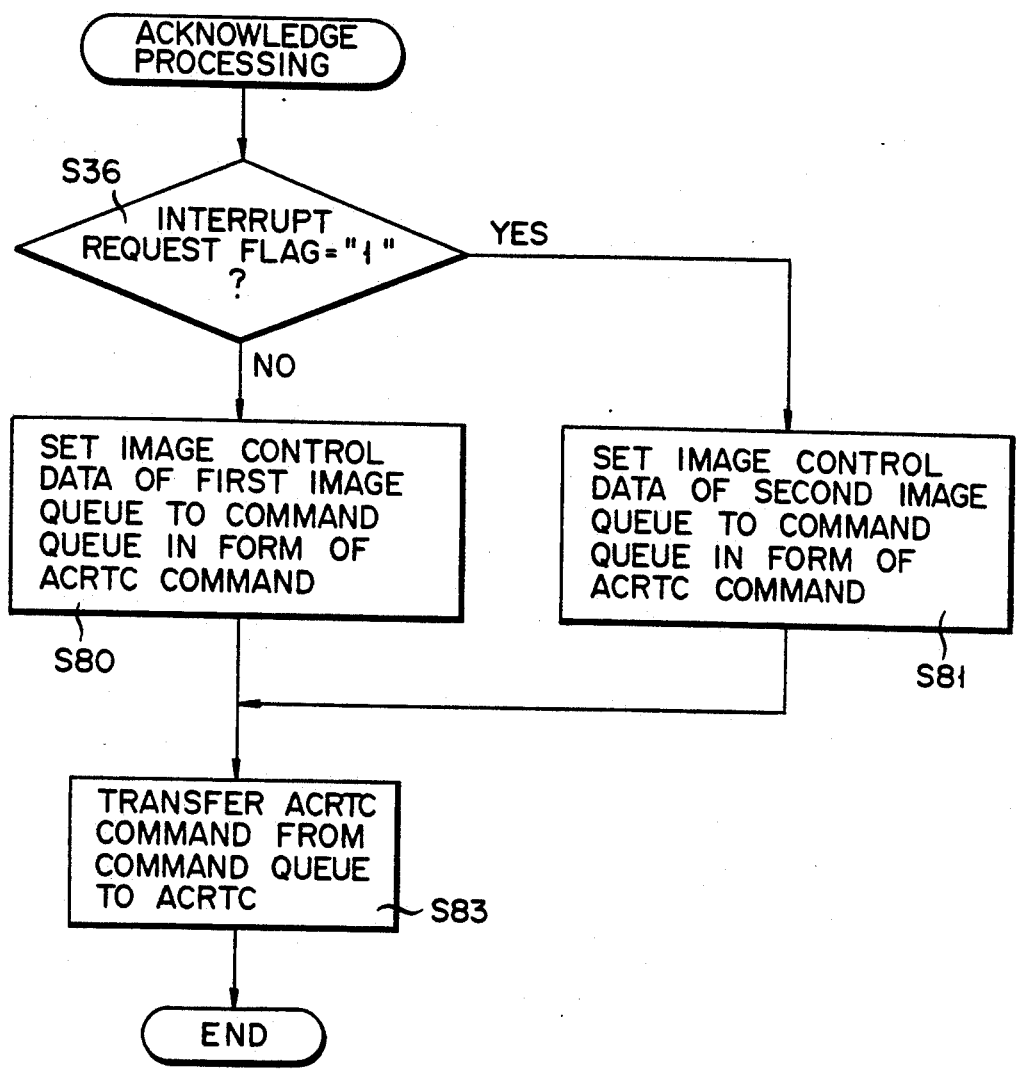

In the acknowledge processing shown in FIG. 17, it is checked in step S36 whether interrupt request flag 13j is set at "1" or not. If flag 13j is detected to be at "0", first image control data in image queue 13f is converted to an ACRT controller command, and stored in ACRT controller command queue 13m in step S80. If flag 13j is detected to be at "1", second image control data in image queue 13d is converted to an ACRT controller stored in ACRT controller command queue 13m in step S81.

Then, the ACRT controller command is transferred from ACRT controller command queue 13m to ACRT controller 34, and an image pattern is formed according to the command and set into image frame buffer 33.

In the label issuing processing shown in FIG. 18, an ACRT controller command for printing a label based on an image pattern derived from first image control data is transferred to ACRT controller 34 in step S86, and the number of remaining labels is counted in step S51.

In the label issuing processing shown in FIG. 19, an ACRT controller command for printing a label based on an image pattern derived from second image control data is transferred to ACRT controller 34 in step S87, and the number of remaining labels is counted in step S58.

In step S88, interrupt request flag 13j is set to "0", a command for clearing image frame buffer 33 is set in ACRT controller 34, and ACRT controller command queue 13m is cleared.

With this construction, when stop key 31c is depressed during the operation of issuing normal labels, the normal label issuing operation is interrupted, and the number of remaining labels is set in printing queue 13e. After this, if interrupt key 31d is depressed, interrupt request flag 13j is set and image frame buffer 33 and ACRT controller command queue 13m are cleared. Next, format data and batch data for the interrupt label are input, and image formation data included in the input data is set in second image queue 13f and printing-issuing condition data is set in printing queue 13e. If, in this condition, acknowledge key 31i is operated, data in image queue 13f is converted to an ACRT controller command and set in ACRT controller command queue 13m. Further, the command is transferred from ACRT controller command queue 13m to ACRT controller 34, and a corresponding image pattern is stored in image frame buffer 33.

Then, if start key 31j is operated, data for the interrupt label stored in image frame buffer 33 is supplied to thermal head 16 and printed on a label and the printed label is issued. At the end of the label issuing operation, interrupt request flag area 13j, image frame buffer 33 and ACRT controller command queue 3m are cleared.

In this condition, if start key 31j is operated, data in image queue 13d is set in the form of ACRT controller command into ACRT controller command queue 13m, and then the normal label issuing operation is continuously effected based on the number of remaining labels saved in printing queue 13e.

As described above, in a case where ACRT controller 34 is used for controlling image frame buffer 33, it is not necessary to use both the first and second frame buffers in the label printer, and therefore the memory capacity of RAM 13 can be reduced.

What is claimed is:

1. A label printer, comprising:
   input means for inputting at least on interrupt command and first and second label data;
   processing means for processing each of said first and second label data which is input by said input means, to produce control data including image data specifying an image of labels to be printed and number data specifying a number of labels to be printed; and
   printing means for printing a group of labels according to the control data produced by said processing means;
   wherein said processing means includes:
   first and second memory means for storing first and second control data produced from the first and second label data, respectively;
   first control means for enabling said printing means to print a first label group by using the first control data stored in the first memory means; and
   second control means (a) for interrupting printing of the first label group in response to an interrupt command input by said input means, and then changing the number data stored in the first memory means to indicate the number of labels left unprinted at a time of the interruption, the first control data and the changed number data being held in said first memory means during the interruption (b) for enabling said printing means to print a second label group, during the interruption, by using the second control data stored in said second memory means, and (c) for enabling the printing means to print the first label group by using the first control data stored in said first memory means upon completion of the printing of the second label group.

2. A label printer according to claim 1, wherein said processing means includes means for selectively determining, as one of said first and second label data, the label data which is input before printing of the first label group is interrupted, and for determining, as said second label data, the label data which is input after printing of the first label group is interrupted.

3. A label printer according to claim 2, wherein said processing means includes switch means for designating a test mode and third memory means holding label data for test printing; and
   said determining means includes means for checking said switch means to determine the label data for a test printing as said second label data when the test mode is designated.

4. A label printer according to claim 1, wherein said printing means includes:
   a print head; and
   a controller for driving said print head in accordance with the image data included in the control data produced by said processing means.

5. A label printer according to claim 1, wherein said input means comprises a keyboard unit at least including a plurality of data input keys.

6. A label printer according to claim 5, wherein:
   said keyboard unit includes a start key; and
   said processing means includes means for detecting that said start key is operated, and for then allowing said first control means to start printing the first label group.

7. A label printer according to claim 6, wherein said keyboard unit includes a start key; and
   said processing means includes means for detecting that said start key is operated prior to the operation of said start key, allowing label data to be input by means of said data input keys, and for then determining the label data as said first label data.

8. A label printer according to claim 7, wherein:
   said processing means includes means for detecting that said stop key is operated as said interrupt command.

9. A label printer according to claim 8, wherein:
said keyboard unit includes an interrupt key; and
said processing means includes means for detecting that said interrupt key is operated after operation of said stop key, allowing label data to be input by means of said data input keys, and for then determining the label data as said second label data.

10. A printer for printing an image on a printing medium, comprising:
input means for inputting at least an interrupt command and first and second input data;
processing means for processing each of said first and second input data which is input by said input means, to produce control data including image data specifying an image to be printed on a printing medium and number data specifying a number of the printing media on which said image is to be printed; and
printing means for printing a group of said printing media according to the control data produced by said processing means;
wherein said processing means includes:
first and second memory means for storing first and second control data produced from the first and second input data, respectively;
first control means for enabling said printing means to print a first group of printing media by using the first control data stored in the first memory means; and
second control means (a) for interrupting printing of the first group of printing media in response to an interrupt command input by said input means, and then changing the number data stored in the first memory means to indicate the number of the printing media left unprinted at a time of the interruption, the first control data and the changed number data being held in said first memory means during the interruption, (b) for enabling said printing means to print a second group of printing media, during the interruption, by using the second control data stored in said second memory means, and (c) for enabling the printing means to print the first group of printing media by using the first control data stored in said first memory means upon completion of the printing of the second group of printing media.

11. A printer according to claim 10, wherein said processing means includes means for selectively determining, as one of said first and second input data, the input data which is input before printing of the first group of printing media is interrupted, and for determining, as said second input data, the input data which is input after printing of the first group of printing media is interrupted.

12. A printer according to claim 11, wherein:
said processing means includes switch means for designating a test mode and third memory means holding data for a test printing; and
said determining means includes means for checking said switch means to determine the data for a test printing as said second input data when the test mode is designated.

13. A printer according to claim 10, wherein said printing means includes:
a print head; and
a controller for driving said print head in accordance with the image data included in the control data produced by said processing means.

14. A printer according to claim 10, wherein said input means comprises a keyboard unit including at least a plurality of data input keys.

15. A printer according to claim 14, wherein:
said keyboard unit includes a start key; and
said processing means includes means for detecting that said start key is operated, and for then allowing said first control means to start printing the first group of printing media.

16. A printer according to claim 15, wherein:
said keyboard unit includes a format key; and
said processing means includes for detecting that said format is operated prior to the operation of said start key, allowing input data to be input by means of said data input keys, and for then determining the input data as said first input data.

17. A label printer according to claim 16, wherein:
said keyboard unit includes a stop key; and
said processing means includes means for detecting that said stop key is operated as said interrupt command.

18. A label printer according to claim 17, wherein:
said keyboard unit includes an interrupt key; and
said processing means includes means for detecting that said interrupt key is operated after operation of said stop key, allowing input data to be input by means of said data input keys, and for then determining the input data as said second input data.

19. A printer for printing an image on a printing medium, comprising:
input means for inputting at least an interrupt command and first and second input data;
processing means for processing each of said first and second input data which is input by said input means, to produce image data specifying an image to be printed on a printing medium; and
printing means for printing a group of said printing media according to the image data produced by said processing means;
wherein said processing means includes:
first and second memory means for storing first and second image data produced from the first and second input data, respectively;
first control means for enabling said printing means to print a first group of printing media by using the first image data stored in the first memory means; and
second control means (a) for interrupting printing of the first group of printing media in response to an interrupt command input by said input means, the first image data being held in said first memory means during the interruption, (b) for enabling said printing means to print a second group of printing media, during the interruption, by using the second image data stored in said second memory means, and (c) for enabling the printing means to print the first group of printing media by using the first image data stored in said first memory means upon completion of the printing of the second group of printing media.

* * * * *